(12) United States Patent  
Buehler

(10) Patent No.: US 12,268,115 B2  
(45) Date of Patent: Apr. 8, 2025

(54) PLANTER OBSTRUCTION MONITORING AND ASSOCIATED DEVICES AND METHODS

(71) Applicant: Ag Leader Technology, Ames, IA (US)

(72) Inventor: Brett Buehler, Dallas Center, IA (US)

(73) Assignee: Ag Leader Technology, Ames, IA (US)

( * ) Notice: Subject to any disclaimer, the term of this patent is extended or adjusted under 35 U.S.C. 154(b) by 548 days.

(21) Appl. No.: 17/170,752

(22) Filed: Feb. 8, 2021

(65) Prior Publication Data

US 2021/0243941 A1    Aug. 12, 2021

Related U.S. Application Data

(60) Provisional application No. 62/971,307, filed on Feb. 7, 2020.

(51) Int. Cl.
| | |
|---|---|
| *A01B 79/02* | (2006.01) |
| *A01B 61/00* | (2006.01) |
| *A01C 7/08* | (2006.01) |
| *A01C 14/00* | (2006.01) |
| *G07C 5/08* | (2006.01) |

(52) U.S. Cl.
CPC ............. *A01B 79/02* (2013.01); *A01B 61/00* (2013.01); *A01C 7/08* (2013.01); *A01C 14/00* (2013.01); *G07C 5/085* (2013.01)

(58) Field of Classification Search
CPC ........... A01B 79/02; A01B 61/00; A01C 7/08; A01C 14/00
See application file for complete search history.

(56) References Cited

U.S. PATENT DOCUMENTS

| 54,633 A | 5/1866 | Wilkinson |
|---|---|---|
| 605,348 A | 3/1905 | Schultz |
| 1,678,643 A | 7/1928 | Kassebeer |
| 1,731,356 A | 10/1929 | Smith |
| 2,357,760 A | 9/1944 | Peacock |
| 3,233,523 A | 2/1966 | Passaggio |

(Continued)

FOREIGN PATENT DOCUMENTS

| AU | 2006203367 A1 | 2/2007 |
|---|---|---|
| AU | 2010201330 A1 | 3/2011 |

(Continued)

OTHER PUBLICATIONS

Zimmerman Manufacturing LLC "Contour King St Gallery".

(Continued)

*Primary Examiner* — Jamie L McGowan  
(74) *Attorney, Agent, or Firm* — Dentons Davis Brown PC; Matthew Warner-Blankenship

(57) ABSTRACT

A system for monitoring rocks in a field. The system includes at least one row unit having an opening disk, a gauge wheel, and a gauge wheel load sensor. The system further includes a processor and a storage media. In various implementations, the system evaluates gauge wheel load sensor data, vertical acceleration data, and/or down force bore pressure data to detect when a row unit strikes a rock. In some implementations, the system can detect the size of the rock, the location of the rock within the soil, and the severity of a rock strike.

16 Claims, 10 Drawing Sheets

(56) References Cited

U.S. PATENT DOCUMENTS

| | | | |
|---|---|---|---|
| 3,718,191 | A | 2/1973 | Williams |
| 3,749,035 | A | 7/1973 | Cayton |
| 3,797,418 | A | 3/1974 | Bridger |
| 3,844,357 | A | 10/1974 | Ellinger |
| 4,167,910 | A | 9/1979 | Pretzer |
| 4,193,458 | A | 3/1980 | Long |
| 4,329,911 | A | 11/1982 | Schwerin |
| 4,359,104 | A | 11/1982 | Haapala |
| 4,417,530 | A | 11/1983 | Kopecky |
| 4,596,200 | A | 6/1986 | Gafford |
| 4,646,663 | A | 3/1987 | Nikkel |
| 4,655,296 | A | 4/1987 | Bourgault |
| 4,700,785 | A | 10/1987 | Bartusek |
| 4,796,550 | A | 1/1989 | Van Natta |
| 4,865,132 | A | 9/1989 | Moore |
| 4,878,443 | A | 11/1989 | Gardner |
| 4,913,070 | A | 4/1990 | Morrison |
| 4,949,656 | A | 8/1990 | Lyle |
| 4,986,782 | A | 1/1991 | Severtson |
| 5,065,681 | A | 11/1991 | Hadley |
| 5,069,779 | A | 12/1991 | Brown |
| 5,074,227 | A | 12/1991 | Schwitters |
| 5,103,924 | A | 4/1992 | Walker |
| 5,163,518 | A | 11/1992 | Foley |
| 5,170,909 | A | 12/1992 | Lundie |
| 5,234,060 | A | 8/1993 | Carter |
| 5,277,257 | A | 1/1994 | Thompson |
| 5,366,024 | A | 11/1994 | Payne |
| 5,427,182 | A | 6/1995 | Winter |
| 5,479,992 | A | 1/1996 | Bassett |
| 5,497,837 | A | 3/1996 | Kehmey |
| 5,499,683 | A | 3/1996 | Bassett |
| 5,529,128 | A | 6/1996 | Peterson |
| 5,709,271 | A | 1/1998 | Bassett |
| 5,829,535 | A | 11/1998 | Line |
| 5,842,248 | A | 12/1998 | Stufflebeam et al. |
| 5,842,428 | A | 12/1998 | Stufflebeam et al. |
| 5,862,764 | A | 1/1999 | Umemoto |
| 5,936,234 | A | 8/1999 | Thomas |
| 5,961,573 | A | 10/1999 | Hale |
| 6,003,455 | A | 12/1999 | Flamme |
| 6,013,020 | A | 1/2000 | Meloul |
| 6,068,063 | A | 5/2000 | Mayerle |
| 6,068,064 | A | 5/2000 | Bettin |
| 6,091,997 | A | 7/2000 | Flamme |
| 6,325,156 | B1 | 12/2001 | Barry |
| 6,378,619 | B2 | 4/2002 | Mayerle |
| 6,389,999 | B1 * | 5/2002 | Duello .................. A01C 5/064 111/900 |
| 6,460,623 | B1 | 10/2002 | Knussman |
| 6,681,706 | B2 | 1/2004 | Sauder et al. |
| 6,701,857 | B1 | 3/2004 | Jensen |
| 6,748,885 | B2 | 6/2004 | Sauder et al. |
| 6,827,029 | B1 | 12/2004 | Wendte |
| 6,863,006 | B2 | 3/2005 | Sandoval |
| 7,263,937 | B2 | 9/2007 | Frasier |
| 7,334,532 | B2 | 2/2008 | Sauder et al. |
| 7,395,767 | B2 | 7/2008 | Sulman |
| 7,395,769 | B2 | 7/2008 | Jensen |
| 7,540,246 | B2 | 6/2009 | Friesen |
| 7,673,570 | B1 | 3/2010 | Bassett |
| 7,694,638 | B1 | 4/2010 | Riewerts |
| 7,699,009 | B2 | 4/2010 | Sauder et al. |
| 7,717,048 | B2 | 5/2010 | Peterson, Jr. et al. |
| 7,870,826 | B2 | 1/2011 | Bourgault |
| 7,938,074 | B2 | 5/2011 | Liu |
| 7,980,186 | B2 | 7/2011 | Henry |
| 8,020,657 | B2 * | 9/2011 | Allard .................. G05D 1/0088 180/167 |
| 8,056,465 | B2 | 11/2011 | Carlz |
| 8,078,367 | B2 | 12/2011 | Sauder |
| 8,275,525 | B2 | 9/2012 | Kowalchuk |
| 8,275,627 | B2 | 9/2012 | Henning |
| 8,286,566 | B2 | 10/2012 | Schilling |
| 8,342,258 | B2 | 1/2013 | Ryder |
| 8,346,442 | B2 | 1/2013 | Ryder |
| 8,371,239 | B2 | 2/2013 | Rans et al. |
| 8,418,636 | B2 | 4/2013 | Liu et al. |
| 8,430,179 | B2 | 4/2013 | Van Buskirk |
| 8,448,587 | B2 | 5/2013 | Kowalchuk |
| 8,448,717 | B2 | 5/2013 | Adams et al. |
| 8,451,449 | B2 | 5/2013 | Holland |
| 8,479,671 | B2 | 7/2013 | Shoup |
| 8,522,889 | B2 | 9/2013 | Adams et al. |
| 8,544,397 | B2 | 10/2013 | Bassett |
| 8,544,398 | B2 | 10/2013 | Bassett |
| 8,550,020 | B2 | 10/2013 | Sauder et al. |
| 8,561,472 | B2 | 10/2013 | Sauder et al. |
| 8,573,111 | B2 | 11/2013 | Graham |
| 8,634,992 | B2 | 1/2014 | Sauder et al. |
| 8,636,077 | B2 | 1/2014 | Bassett |
| 8,755,049 | B2 | 6/2014 | Holland |
| 8,763,713 | B2 | 7/2014 | Bassett |
| 8,770,308 | B2 | 7/2014 | Bassett |
| 8,776,702 | B2 | 7/2014 | Bassett |
| RE45,091 | E | 8/2014 | Bassett |
| 8,814,474 | B2 | 8/2014 | Bell |
| 8,850,998 | B2 | 10/2014 | Garner |
| 8,863,857 | B2 | 10/2014 | Bassett |
| 8,903,545 | B2 | 12/2014 | Riffel |
| 8,909,436 | B2 | 12/2014 | Achen |
| 8,910,582 | B2 | 12/2014 | Mariman et al. |
| 8,924,092 | B2 | 12/2014 | Achen |
| 8,924,102 | B2 | 12/2014 | Sauder et al. |
| RE45,412 | E | 3/2015 | Sauder et al. |
| 8,985,037 | B2 | 3/2015 | Radtke |
| 8,985,232 | B2 | 3/2015 | Bassett |
| 9,055,712 | B2 | 6/2015 | Bassett |
| 9,107,337 | B2 | 8/2015 | Bassett |
| 9,107,338 | B2 | 8/2015 | Bassett |
| 9,113,589 | B2 | 8/2015 | Bassett |
| 9,119,342 | B2 | 9/2015 | Bonefas |
| 9,137,938 | B2 | 9/2015 | Zimmerman |
| 9,144,187 | B2 | 9/2015 | Bassett |
| 9,144,189 | B2 | 9/2015 | Stoller |
| 9,167,740 | B2 | 10/2015 | Bassett |
| 9,173,339 | B2 | 11/2015 | Sauder et al. |
| 9,192,089 | B2 | 11/2015 | Bassett |
| 9,213,905 | B2 | 12/2015 | Trimble |
| 9,226,440 | B2 | 1/2016 | Bassett |
| 9,232,687 | B2 | 1/2016 | Bassett |
| 9,265,191 | B2 | 2/2016 | Sauder et al. |
| 9,288,937 | B2 | 3/2016 | Sauder et al. |
| 9,301,438 | B2 | 4/2016 | Sauder et al. |
| 9,332,689 | B2 | 5/2016 | Baurer |
| 9,338,937 | B2 | 5/2016 | Sauder et al. |
| 9,351,440 | B2 | 5/2016 | Sauder et al. |
| 9,462,744 | B2 | 10/2016 | Isaacson |
| 9,485,900 | B2 | 11/2016 | Connell |
| 9,510,498 | B2 | 12/2016 | Tuttle et al. |
| 9,523,496 | B2 | 12/2016 | Bingham |
| 9,532,496 | B2 | 1/2017 | Sauder et al. |
| 9,554,504 | B2 | 1/2017 | Houck |
| 9,578,802 | B2 | 2/2017 | Radtke |
| 9,585,301 | B1 | 3/2017 | Lund |
| 9,629,304 | B2 | 4/2017 | Zielke |
| 9,675,004 | B2 | 6/2017 | Landphair et al. |
| 9,681,601 | B2 | 6/2017 | Bassett |
| 9,693,496 | B2 | 7/2017 | Tevs |
| 9,699,958 | B2 | 7/2017 | Koch |
| 9,723,778 | B2 | 8/2017 | Bassett |
| 9,746,007 | B1 | 8/2017 | Stoller |
| 9,750,174 | B2 | 9/2017 | Sauder et al. |
| 9,752,596 | B2 | 9/2017 | Sauder |
| 9,788,472 | B2 | 10/2017 | Bassett |
| 9,801,332 | B2 | 10/2017 | Landphair |
| 9,814,172 | B2 | 11/2017 | Achen et al. |
| 9,848,522 | B2 | 12/2017 | Bassett |
| 9,848,523 | B2 | 12/2017 | Sauder |
| 9,854,733 | B1 | 1/2018 | Kile |
| 9,879,702 | B2 | 1/2018 | Stoller |
| 9,955,623 | B2 | 5/2018 | Sauder et al. |
| 9,968,033 | B2 | 5/2018 | Dunn |
| 10,064,322 | B2 | 9/2018 | Luc |

(56) References Cited

U.S. PATENT DOCUMENTS

| | | |
|---|---|---|
| 10,091,926 B2 | 10/2018 | Maro |
| 10,104,830 B2 | 12/2018 | Heathcote |
| 10,143,128 B2 | 12/2018 | Landphair et al. |
| 10,231,376 B1 | 3/2019 | Stanhope |
| 10,257,973 B2 | 4/2019 | Hubner |
| 10,548,259 B2 | 2/2020 | Heathcote |
| 10,609,857 B2 | 4/2020 | Sauder |
| 10,645,865 B2 | 5/2020 | Bassett |
| 10,821,829 B2* | 11/2020 | Foster .................. G05D 1/027 |
| 10,959,369 B2 | 3/2021 | Sieling |
| 11,144,775 B2 | 10/2021 | Ferrari |
| 11,197,411 B2 | 12/2021 | Bassett |
| 11,202,404 B2 | 12/2021 | Walter |
| 11,277,961 B2 | 3/2022 | Campbell |
| 11,612,096 B2 | 3/2023 | Sivinski |
| 11,622,494 B2 | 4/2023 | Arnett et al. |
| 2002/0056407 A1 | 5/2002 | Milne |
| 2002/0073678 A1 | 6/2002 | Lucand |
| 2003/0005867 A1 | 1/2003 | Richard |
| 2003/0183141 A1 | 10/2003 | Bergere et al. |
| 2004/0139895 A1 | 7/2004 | Thompson et al. |
| 2005/0172873 A1 | 8/2005 | Mayerle |
| 2006/0086295 A1 | 4/2006 | Jensen |
| 2008/0110382 A1 | 5/2008 | Brockmeier |
| 2008/0229986 A1 | 9/2008 | Arksey |
| 2009/0056531 A1 | 3/2009 | Jessen |
| 2009/0056537 A1 | 3/2009 | Jessen |
| 2009/0112410 A1 | 4/2009 | Shull |
| 2010/0180808 A1 | 7/2010 | Liu |
| 2010/0192818 A1 | 8/2010 | Garner |
| 2010/0270043 A1 | 10/2010 | Ankenman |
| 2010/0319941 A1 | 12/2010 | Peterson |
| 2011/0027479 A1 | 2/2011 | Reineccius |
| 2011/0313575 A1 | 12/2011 | Kowalchuk |
| 2012/0042813 A1 | 2/2012 | Liu et al. |
| 2012/0046838 A1 | 2/2012 | Landphair et al. |
| 2012/0048159 A1 | 3/2012 | Adams et al. |
| 2012/0151910 A1 | 6/2012 | Sauder |
| 2012/0186503 A1* | 7/2012 | Sauder .................. A01C 7/205 |
| | | 701/50 |
| 2012/0261149 A1 | 10/2012 | Schmidt |
| 2012/0291680 A1 | 11/2012 | Rylander |
| 2013/0032363 A1 | 2/2013 | Curry et al. |
| 2013/0126460 A1 | 2/2013 | Kenley |
| 2013/0126430 A1 | 5/2013 | Kenley |
| 2013/0248212 A1 | 9/2013 | Bassett |
| 2013/0333601 A1 | 12/2013 | Shivak |
| 2014/0026748 A1 | 1/2014 | Stoller |
| 2014/0060869 A1 | 3/2014 | Blunier |
| 2014/0116735 A1* | 5/2014 | Bassett .................. A01C 7/203 |
| | | 172/430 |
| 2014/0190712 A1 | 7/2014 | Bassett |
| 2014/0214284 A1 | 7/2014 | Sauder et al. |
| 2014/0216771 A1 | 8/2014 | Bassett |
| 2014/0238284 A1 | 8/2014 | Kapphahn |
| 2014/0262378 A1 | 9/2014 | Connors |
| 2014/0303854 A1 | 10/2014 | Zielke |
| 2014/0379230 A1 | 12/2014 | Koch |
| 2015/0094916 A1 | 4/2015 | Bauerer et al. |
| 2015/0107501 A1 | 4/2015 | Barton |
| 2015/0176614 A1 | 6/2015 | Stoller |
| 2015/0195988 A1 | 7/2015 | Radtke |
| 2015/0264857 A1* | 9/2015 | Achen .................. A01B 63/32 |
| | | 172/260.5 |
| 2015/0271986 A1 | 10/2015 | Sauder et al. |
| 2015/0305229 A1 | 10/2015 | Sauder |
| 2015/0319919 A1 | 11/2015 | Sauder |
| 2016/0007521 A1 | 1/2016 | Kusler |
| 2016/0007524 A1 | 1/2016 | Kusler |
| 2016/0040692 A1 | 2/2016 | Stoller |
| 2016/0128272 A1 | 5/2016 | Sauder |
| 2016/0143213 A1 | 5/2016 | Kowalchuk |
| 2016/0157412 A1 | 6/2016 | Sauder |
| 2016/0212932 A1 | 7/2016 | Radtke |
| 2016/0227700 A1 | 8/2016 | Wendte |
| 2016/0227701 A1 | 8/2016 | Nelson |
| 2016/0249525 A1 | 9/2016 | Baurer et al. |
| 2017/0000016 A1 | 1/2017 | Prickel |
| 2017/0013771 A1 | 1/2017 | Townsend |
| 2017/0049044 A1 | 2/2017 | Stoller |
| 2017/0086347 A1 | 3/2017 | Sauder |
| 2017/0094889 A1 | 4/2017 | Garner |
| 2017/0223947 A1 | 8/2017 | Gall |
| 2017/0280616 A1 | 10/2017 | Gervais |
| 2017/0354079 A1* | 12/2017 | Foster .................. G05D 1/0276 |
| 2017/0357029 A1 | 12/2017 | Lakshmanan |
| 2017/0359941 A1 | 12/2017 | Czapka |
| 2017/0367252 A1* | 12/2017 | Sakaguchi .......... G05D 1/0214 |
| 2018/0015490 A1 | 1/2018 | Grimm |
| 2018/0024549 A1 | 1/2018 | Hurd |
| 2018/0092287 A1 | 4/2018 | Garner |
| 2018/0092288 A1 | 4/2018 | Garner |
| 2018/0092289 A1 | 4/2018 | Wonderlich |
| 2018/0092295 A1 | 4/2018 | Sugumaran |
| 2018/0125000 A1 | 5/2018 | Levy |
| 2018/0132422 A1 | 5/2018 | Hassanzadeh et al. |
| 2018/0132423 A1 | 5/2018 | Rowan |
| 2018/0168094 A1 | 6/2018 | Koch |
| 2018/0169094 A1 | 6/2018 | Koch |
| 2018/0199499 A1 | 7/2018 | Adams |
| 2018/0199505 A1 | 7/2018 | Beaujot |
| 2018/0206393 A1 | 7/2018 | Stoller |
| 2018/0210443 A1* | 7/2018 | Matsuzaki .......... G05D 1/0088 |
| 2018/0263174 A1 | 9/2018 | Hodel |
| 2018/0292339 A1 | 10/2018 | Gunzenhauser |
| 2018/0317380 A1 | 11/2018 | Bassett |
| 2018/0317381 A1 | 11/2018 | Bassett |
| 2018/0368310 A1 | 12/2018 | Zimmerman |
| 2018/0373264 A1* | 12/2018 | Madsen ................ A01B 69/008 |
| 2019/0021211 A1 | 1/2019 | Gutknecht |
| 2019/0029165 A1 | 1/2019 | Leimkuehler et al. |
| 2019/0045703 A1 | 2/2019 | Bassett |
| 2019/0059206 A1 | 3/2019 | Stanhope |
| 2019/0072114 A1 | 3/2019 | Myers et al. |
| 2019/0075714 A1 | 3/2019 | Koch |
| 2019/0124824 A1 | 5/2019 | Hubner |
| 2019/0162164 A1 | 5/2019 | Funk |
| 2019/0174666 A1* | 6/2019 | Manternach ......... A01B 79/005 |
| 2019/0191622 A1 | 6/2019 | Hafvenstein |
| 2019/0232304 A1 | 8/2019 | Grimm |
| 2019/0239413 A1 | 8/2019 | DeGarmo |
| 2019/0254223 A1 | 8/2019 | Eichhorn et al. |
| 2019/0286915 A1 | 9/2019 | Patil |
| 2019/0297769 A1 | 10/2019 | Zielke et al. |
| 2019/0297774 A1 | 10/2019 | Hamilton |
| 2019/0302799 A1 | 10/2019 | Schaff |
| 2019/0373801 A1 | 12/2019 | Schoeny |
| 2019/0380259 A1 | 12/2019 | Frank |
| 2020/0029486 A1 | 1/2020 | Buehler et al. |
| 2020/0045869 A1 | 2/2020 | Stanhope |
| 2020/0068778 A1 | 3/2020 | Schoeny |
| 2020/0068783 A1 | 3/2020 | Strnad |
| 2020/0100419 A1* | 4/2020 | Stanhope ............... A01B 19/10 |
| 2020/0100421 A1 | 4/2020 | Wang |
| 2020/0109954 A1 | 4/2020 | Li |
| 2020/0128723 A1 | 4/2020 | Eichhorn |
| 2020/0154627 A1* | 5/2020 | Plattner ............... A01B 63/114 |
| 2020/0154629 A1 | 5/2020 | Holoubek et al. |
| 2020/0178455 A1 | 6/2020 | Ishikawa |
| 2020/0221630 A1* | 7/2020 | Pomedli ............. G05D 1/0088 |
| 2020/0305335 A1* | 10/2020 | Schoeny ................ A01B 71/08 |
| 2020/0329631 A1 | 10/2020 | Johnson |
| 2020/0352088 A1 | 11/2020 | Arnett |
| 2020/0359559 A1 | 11/2020 | Koch |
| 2020/0375081 A1 | 12/2020 | Holoubek |
| 2021/0022286 A1 | 1/2021 | Gilbert et al. |
| 2021/0051846 A1 | 2/2021 | Vandenbark |
| 2021/0059102 A1 | 3/2021 | Geistkemper |
| 2021/0120726 A1* | 4/2021 | Barrick .................. A01B 5/00 |
| 2021/0132618 A1 | 5/2021 | Van Roekel |
| 2021/0153421 A1 | 5/2021 | Holoubek et al. |
| 2021/0161060 A1 | 6/2021 | Kaufmann |
| 2021/0185903 A1 | 6/2021 | Demiter et al. |
| 2021/0235611 A1 | 8/2021 | Fett |

(56) References Cited

U.S. PATENT DOCUMENTS

| | | |
|---|---|---|
| 2021/0307236 A1 | 10/2021 | Strnad |
| 2021/0315147 A1 | 10/2021 | Fanshier |
| 2022/0000008 A1 | 1/2022 | Hubner |
| 2022/0061202 A1 | 3/2022 | Holoubek et al. |
| 2022/0061208 A1 | 3/2022 | Campbell et al. |
| 2022/0142039 A1 | 5/2022 | Eichhorn et al. |
| 2022/0151138 A1 | 5/2022 | Barry |
| 2022/0174855 A1 | 6/2022 | Zielke et al. |
| 2022/0232753 A1 | 7/2022 | Van De Woestyne |
| 2022/0272888 A1 | 9/2022 | Hodel |
| 2023/0145955 A1 | 5/2023 | Schmidt et al. |
| 2023/0180653 A1 | 6/2023 | Barry et al. |
| 2023/0232733 A1 | 7/2023 | Barry |
| 2023/0388458 A1 | 11/2023 | Eichhorn et al. |
| 2023/0413720 A1 | 12/2023 | Barry et al. |
| 2024/0334864 A1 | 10/2024 | Holoubek et al. |

FOREIGN PATENT DOCUMENTS

| | | |
|---|---|---|
| AU | 2017382800 B2 | 6/2018 |
| CA | 2549371 A1 | 11/2007 |
| CA | 2584736 A1 | 9/2008 |
| CN | 108362267 B | 8/2018 |
| CN | 112601450 A | 4/2021 |
| EP | 372901 A2 | 6/1990 |
| EP | 606541 A1 | 1/1997 |
| EP | 3698615 A1 | 8/2020 |
| GB | 18381 | 10/1904 |
| GB | 2309622 A | 6/1997 |
| JP | 4517467 B2 | 8/2010 |
| KR | 101728137 B1 | 4/2017 |
| RU | 2355152 C2 | 5/2009 |
| SU | 948316 A1 | 8/1982 |
| SU | 1148582 A1 | 4/1985 |
| WO | 2009134144 A1 | 11/2009 |
| WO | 2014153157 A1 | 9/2014 |
| WO | 2015171908 A1 | 11/2015 |
| WO | 2017160860 A1 | 9/2017 |
| WO | 2017197274 A1 | 11/2017 |
| WO | 2017197292 A1 | 11/2017 |
| WO | 2018151989 A1 | 8/2018 |
| WO | 2021021594 A1 | 2/2021 |

OTHER PUBLICATIONS

Zimmerman Manufacturing LLC "Contour King ST" Zimmerman Manufacturing Equipment.
Precision Planting "FurrowForce" https://www.precisionplanting.com/products/product/furrowforce.
Precision Planting "FurrowJet" https://www.precisionplanting.com/products/product/furrowjet.
Kasper et al. "Relationship Between Six Years of Corn Yields and Terrain Attributes." 2003, Precision Agriculture vol. 4, pp. 87-101.
Orthman "1tRIPr Precision Tillage System" Brochure.
Deere "SeedStar XP Monitor for Planters" pp. 70-8-70-9.
ZML Contour King—YouTube Video—https://www.youtube.com/watch?v=T-rj_EZMCM4.
Dawn Equipment—Twitter Video—https://twitter.com/DawnEquipment/status/969698839409111045.
360 Yield Sensor—Wave.
Precision Planting 2010 Full Line Brochure.
Industrial Electronics Robust control of active suspensions for high performance vehicles, 1996.
Industrial electronics, modeling and force tracking control of hydraulic actuator for an active suspension system, 2006.
Manitoba, design of a spring-loaded downforce system for a no-till seed opener, 2003.
John Deere Delta Force Diagram.
Modular Row Crop Planting Systems from Excel Agriculture, available as early as 2002—https://www.excelagr.com.au/excel-agri-row-crop-planter.php.
Janke Australia, available as early as 2017—https://www.janke.com.au/.
8910 Floating Hitch Cultivator, available as early as 2010—https://www.bourgault.com/en-us/products/tillage/8910-cultivator.
Patriot Parallelogram Tyne Planter Farm Equipment Gessner, available as early as 2017—https://www.gessner.com.au/products/patriot-parallelogram-tyne-planter/.
Ground Breaker Precision Planters and Patented Tyne and Disc Row Units—https://www.precisionagsolutions.com.au/ground-breaker.
Parallelogram Tyne Units—https://bossagriculture.com.au/home/planter-row-units/parallelogram-tyne-units/.
What to Look for in a No Till or Minimum Tillage Planter—https://multifarmingsystems.com.au/wp-content/uploads/2015/07/What-to-Look-for-in-a-No-Till-or-Minimum-Tillage-Planter.pdf.
Boss 18 Metre Parallelogram Tyne Planter—https://www.thecombineforum.com/threads/boss-18-metre-parallelogram-tyne-planter-on-9-spacing.222722/.
Precision tyne planter takes innovation award, 2017, https://www.graincentral.com/machinery/precision-tyne-planter-takes-innovation-award.
Enfield Technologies, EQV Proportional Pinch Valves, https://www.enfieldtech.com/Products/EQV-Proportional-Pinch-Valves.
Farm Equipment—ZML.
Zong-Yi et al., Minesweeping Tank, Electrohydraulic System Using RBF Neural Network and Genetic Algorithm, 2010.

* cited by examiner

PLANTER OBSTRUCTION MONITORING AND ASSOCIATED DEVICES AND METHODS

CROSS-REFERENCE TO RELATED APPLICATIONS

This application claims the benefit of U.S. Provisional Application 62/971,307, filed Feb. 7, 2020, and entitled "Planter Rock Monitoring and Associated Devices and Methods," under 35 U.S.C. § 119(e), which is hereby incorporated herein by reference in its entirety for all purposes.

TECHNICAL FIELD

The disclosure relates to agricultural planters and associated systems, devices, and methods. More particularly this disclosure relates to systems for use in association with high-speed planting.

BACKGROUND

It is appreciated that striking rocks or other obstructions with a row unit or component thereof can damage the row unit and/or components thereof. At high speeds, such as those used when high speed planting, the damage to row units may be greater and/or more frequent. Many agricultural fields are rocky and as such the use of high-speed planting may be limited due to the potential damage to the row units by rocks when planting at high speeds. That is, it would be understood that striking a rock at lower speeds may cause minimal or no damage, while striking the same rock at a high speed may destroy a row unit or cause severe damage. Damage to row units may result in costly repairs, unexpected and/or lengthy downtime, and/or poor planting performance each of which may result in loss efficiency and overall profit for stakeholders.

There is a need in the art for devices, systems, and methods, for detecting rocks within fields.

BRIEF SUMMARY

Disclosed herein are various devices, systems, and methods for detecting, predicting, and responding to the presence of rocks within fields. More particularly, the disclosure provides for a system that is able to detect the presence of rocks as well as the size of each rock and severity of a rock strike. Further, the system may analyze the location of rocks and provide a planting prescription map configured to minimize or eliminate damage to row units during high-speed planting.

In various implementations, one or more computers may be configured to perform particular operations or actions by virtue of having software, firmware, hardware, or a combination of them installed on the system that in operation causes or cause the system to perform the actions. Further, one or more computer programs can be configured to perform particular operations or actions by virtue of including instructions that, when executed by data processing apparatus, cause the apparatus to perform the actions.

In Example 1, an agricultural planter monitoring system, comprising a plurality of row units, each row unit comprising at least one gauge wheel and a gauge wheel load sensor in communication with the at least one gauge wheel, and a processor in communication with the gauge wheel load sensor, wherein the processor is configured to monitor data from the gauge wheel load sensor to determine when a row unit strikes debris.

Example 2 relates to the system of Example 1, wherein debris is a rock.

Example 3 relates to the system of Example 1, further comprising a storage media in communication with the processor, the storage media constructed and arranged to store data about debris strikes.

Example 4 relates to the system of Example 3, wherein the storage media stores at least one of debris strike location, debris strike severity, acceleration of the row unit at time of debris strike, and gauge wheel load.

Example 5 relates to the system of Example 1, further comprising a display in communication with the processor, the display configured to show a user at least one of a map of debris strikes and an alarm for impending debris strikes.

Example 6 relates to the system of Example 1, further comprising an automatic steering system constructed and arranged to slow planter speed when a debris strike is imminent.

Example 7 relates to the system of Example 1, further comprising an inertial measurement unit constructed and arranged to monitor vertical acceleration of a row unit, wherein changes in vertical acceleration are monitored by the processor.

Example 8 relates to the system of Example 1, further comprising a supplemental downforce system wherein a bore pressure of the supplemental downforce system is monitored by the processor and changes in the bore pressure are correlated to changes in terrain including debris presence.

Example 9 relates to the system of Example 1, wherein the processor is further constructed and arranged to determine debris size, location, and vertical position.

In Example 10, a method for sensing debris in an agricultural field comprising monitoring gauge wheel load sensor data on-the-go and determining debris strikes from the gauge wheel load sensor data.

Example 11 relates to the method of Example 10, wherein a debris strike is found when gauge wheel load decreases at a rate above a predetermined threshold.

Example 12 relates to the method of Example 10, further comprising determining size of debris, wherein the size of debris is correlated to a time between debris strike and disengagement with debris.

Example 13 relates to the method of Example 10, further comprising determining debris height, wherein debris height is correlated to a difference between peak gauge wheel load after disengaging debris and normal operating gauge wheel load.

Example 14 relates to the method of Example 10, further comprising monitoring vertical acceleration of a row unit.

Example 15 relates to the method of Example 10, further comprising monitoring bore pressure of a supplemental downforce system.

Example 16 relates to the method of Example 10, further comprising generating a speed prescription map.

Example 17 relates to the method of Example 10, further comprising generating a debris location map.

Example 18 relates to the method of Example 10, further comprising alerting a user of an impending debris strike.

In Example 19, an agricultural row unit, comprising a gauge wheel, a gauge wheel load sensor in communication with the gauge wheel, an inertial measurement unit configured to measure vertical acceleration, and a supplemental downforce system comprising a bore having a bore pressure, wherein changes in one or more of gauge wheel load, vertical acceleration, and bore pressure indicate striking of debris.

Example 20 relates to the system of Example 19, wherein changes in one or more of the gauge wheel load, vertical acceleration, and bore pressure are correlated to size of debris, vertical location of debris on or within soil, and row unit stress.

While multiple embodiments are disclosed, still other embodiments of the disclosure will become apparent to those skilled in the art from the following detailed description, which shows and describes illustrative embodiments of the invention. As will be realized, the disclosure is capable of modifications in various obvious aspects, all without departing from the spirit and scope of the disclosure. Accordingly, the drawings and detailed description are to be regarded as illustrative in nature and not restrictive.

DETAILED DESCRIPTION

Figure 1:
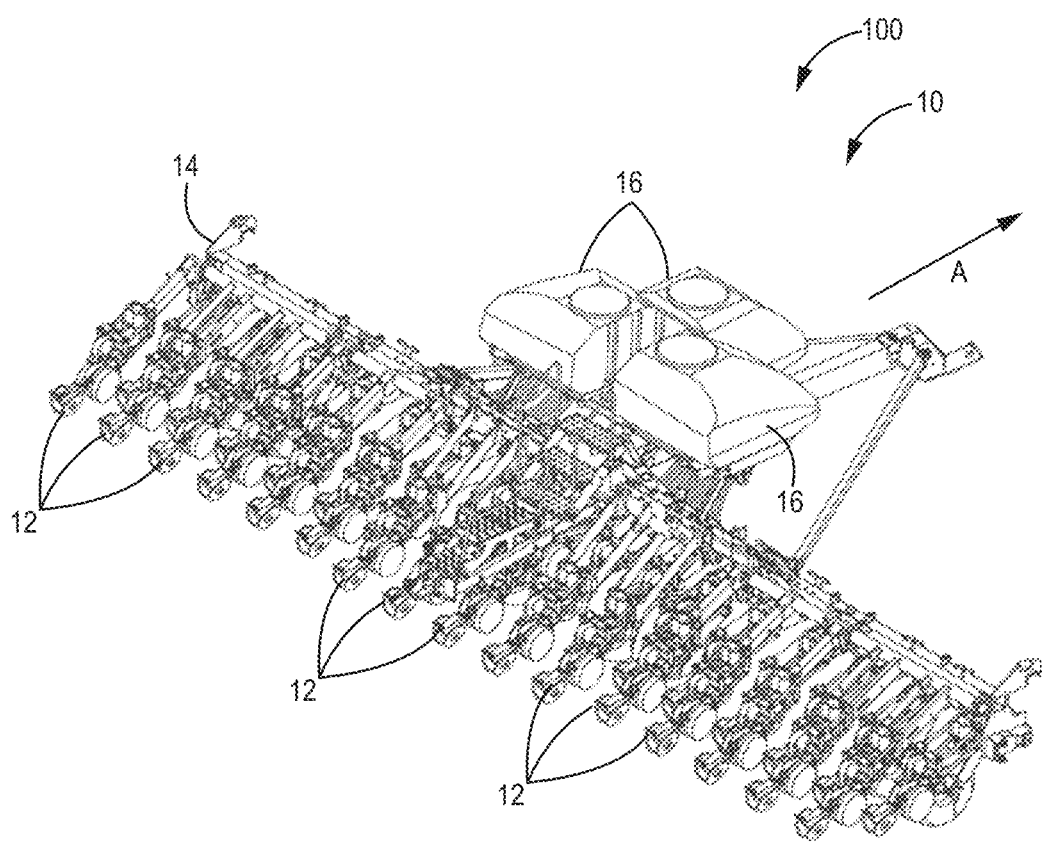
FIG. 1 is a perspective view of a planter, according to one implementation.

Disclosed herein is a planting system configured to detect obstructions, such as rocks, within a field and provide outputs corresponding to the detected obstructions. The various implementations described herein provide a system constructed and arranged to sense obstruction strikes on-the-go, during planting. In some implementations, the system is further constructed and arranged to record the location of sensed obstructions either automatically or manually. In further implementations, the system is configured to generate and store a speed prescription map. In yet further implementations, the system is configured to integrate with another system or device or may itself automatically control ground speed of an agricultural implement or generate alerts for a user to manually adjust ground speed. In other implementations, the system is constructed and arranged to improve the function of a supplemental downforce system, and as such may be integrated therewith, such as for example the SureForce® system or others known in the art. In various implementations, the system is constructed and arranged to determine obstruction strikes, strike severity, obstruction size, and obstruction location using one or more of gauge wheel load data, acceleration data, downforce pressure data, and global positioning system (GPS) data.

Certain of the disclosed implementations of the monitoring system 100, and associated devices and methods can be used in conjunction with and/or integrated with any of the devices, systems, or methods taught or otherwise disclosed in U.S. application Ser. No. 16/121,065, filed Sep. 1, 2018, and entitled "Planter Down Pressure and Uplift Devices, Systems, and Associated Methods," U.S. Pat. No. 10,743,460, filed Oct. 3, 2018, and entitled "Controlled Air Pulse Metering Apparatus for an Agricultural Planter and Related Systems and Methods," U.S. application Ser. No. 16/272,590, filed Feb. 11, 2019, and entitled "Seed Spacing Device for an Agricultural Planter and Related Systems and Methods," U.S. application Ser. No. 16/142,522, filed Sep. 26, 2018, and entitled "Planter Downforce and Uplift Monitoring and Control Feedback Devices, Systems and Associated Methods," U.S. application Ser. No. 16/280,572, filed Feb. 20, 2019 and entitled "Apparatus, Systems and Methods for Applying Fluid," U.S. application Ser. No. 16/371,815, filed Apr. 1, 2019, and entitled "Devices, Systems, and Methods for Seed Trench Protection," U.S. application Ser. No. 16/523,343, filed Jul. 26, 2019, and entitled "Closing Wheel Downforce Adjustment Devices, Systems, and Methods," U.S. application Ser. No. 16/670,692, filed Oct. 31, 2019, and entitled "Soil Sensing Control Devices, Systems, and Associated Methods," U.S. application Ser. No. 16/684,877, filed Nov. 15, 2019, and entitled "On-The-Go Organic Matter Sensor and Associated Systems and Methods," U.S. application Ser. No. 16/752,989, filed Jan. 27, 2020, and entitled "Dual Seed Meter and Related Systems and Methods," U.S. application Ser. No. 16/891,812, filed Jun. 3, 2020, and entitled "Apparatus, Systems, and Methods for Row Cleaner Depth Adjustment On-The-Go," U.S. application Ser. No. 16/921,828, filed Jul. 6, 2020, and entitled "Apparatus, Systems and Methods for Automatic Steering Guidance and Visualization of Guidance Paths," U.S. application Ser. No. 16/939,785, filed Jul. 27, 2020, and entitled "Apparatus, Systems and Methods for Automated Navigation of Agricultural Equipment," U.S. application Ser. No. 16/997,361, filed Aug. 19, 2020, and entitled "Apparatus, Systems, and Methods for Steerable Toolbars," U.S. application Ser. No. 16/997,040, filed Aug. 19, 2020, and entitled "Adjustable Seed Meter and Related Systems and Methods," U.S. application Ser. No. 17/011,737, filed Aug. 3, 2020, and entitled "Planter Row Unit and Associated Systems and Methods," U.S. application Ser. No. 17/060,844, filed Oct. 1, 2020, and entitled "Agricultural Vacuum and Electrical Generator Devices, Systems, and Methods," U.S. application Ser. No. 17/105,437, filed Nov. 25, 2020, and entitled "Devices, Systems And Methods For Seed Trench Monitoring And Closing," U.S. application Ser. No. 17/127,812, filed Dec. 18, 2020, and entitled "Seed Meter Controller and Associated Devices, Systems, and Methods," U.S. application Ser. No. 17/132,152, filed Dec. 23, 2020, and entitled "Use of Aerial Imagery For Vehicle Path Guidance And Associated Devices, Systems, And Methods," and U.S. application Ser. No. 17/164,213 filed Feb. 1, 2021 and entitled "Row Unit Parallel Arm Sensor and Associated Systems and Methods," each of which is incorporated herein.

In various implementations, the system 100 may be implemented on any known planter 10 and/or row unit 12 configuration, as would be understood. As would be appreciated by those of skill in the art, planters 10 and row units 12 may be in myriad configurations and include various devices and systems. Turning to the figures in greater detail, FIG. 1 depicts a planter 10 fitted with an exemplary implementation of the disclosed system 100. Such implementations of the system 100 are adapted to operate with such a planter 10 including a plurality of row units 12 constructed and arranged for planting row crops such as corn, optionally at high speed.

The planting machine 10 in this specific implementation is a row crop planter 12 having a central crossbar 14 and multiple planting row units 12 mounted to the crossbar 14. It is understood that, generally, the row units 12 on a particular planter (such as exemplary planter 10) are typically identical or substantially similar. The seeding machine 10 moves forward and backward via the fore-aft direction shown by the arrow A.

In various implementations, the planter 10 includes at least one hopper 16 to hold seed. In certain implementations, the planter 10 includes unit hoppers on each planting unit 12 such that seed can be delivered from the hopper 16 to a unit hopper (such as hopper 18 shown in FIG. 2) on each unit 12. In a further alternative implementation, any known hopper or seed retention device configuration can be incorporated into the planter 10 and the separate row units 12 and function with a monitoring system 100 implementation, as described herein.

Figure 2:
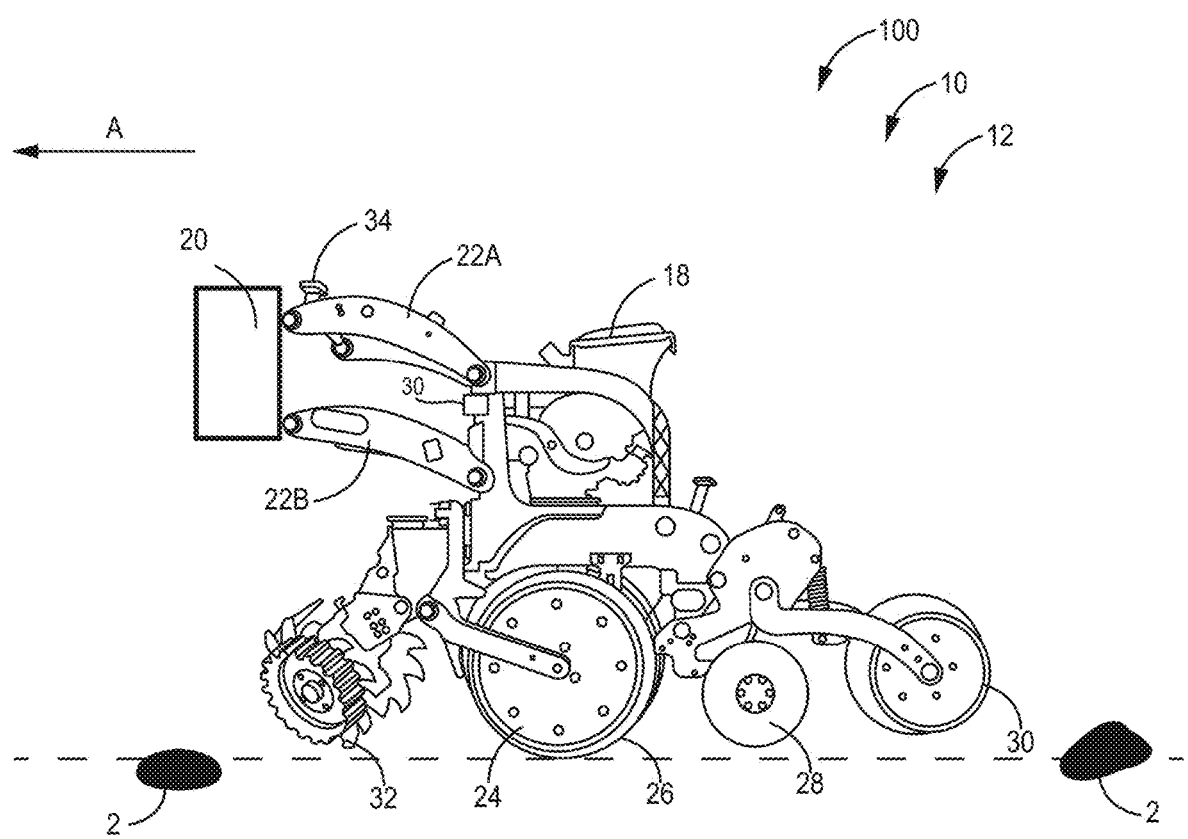
FIG. 2 is a side view of a row unit, according to one implementation.
Figure 3:
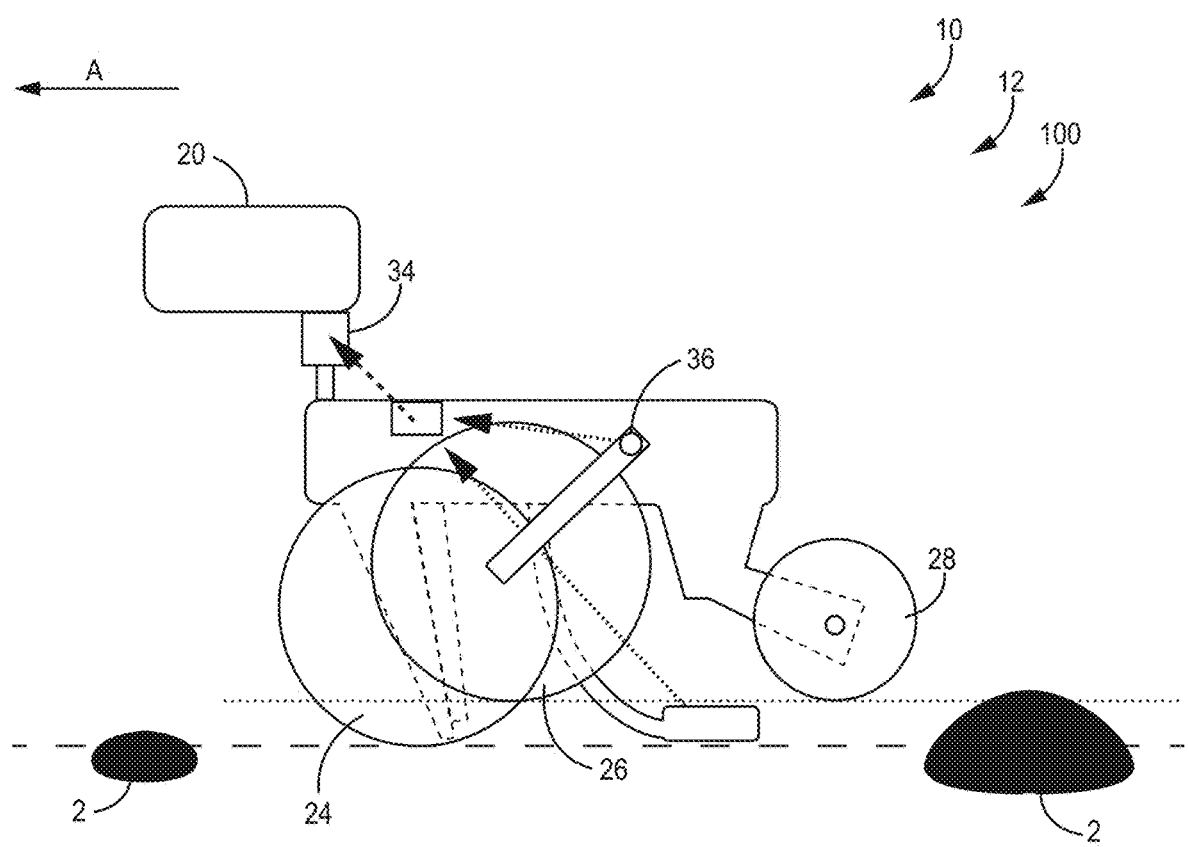
FIG. 3 is a side view of a row unit, according to one implementation.
Figure 4:
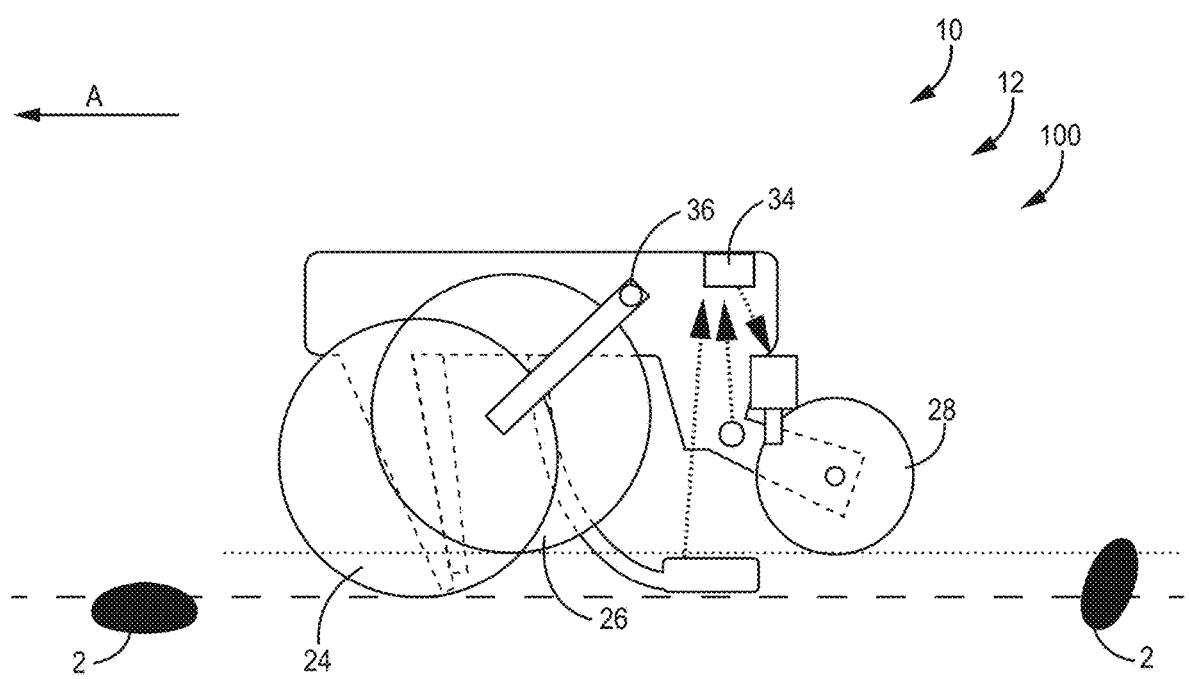
FIG. 4 is a side view of a row unit, according to one implementation.

Examples of row units 12 having a monitoring system 100 are depicted in greater detail in FIGS. 2-4. It is understood that the monitoring system 100 according to any implementation disclosed or contemplated herein can be incorporated into any known row unit 12 having any configuration.

The particular exemplary row unit 12 of FIG. 2 is jointedly coupled to the central crossbar 20 via a parallelogram linkage 22 made up of two linkage arms 22A, 22B such that the individual units 12 are vertically moveable by a predetermined amount relative to the crossbar 20. The exemplary row unit 12 in this implementation has known components, including a hopper 18, gauge wheels 26 (controlling the depth of the furrow), furrow opening disks 24 (to form an open furrow in the soil beneath the seeding machine 10 into which seed is deposited), and a closing wheel and/or packing wheel (or wheels, in this specific example) 28 (to close the furrow over the deposited seed and to firm the soil in the closed furrow), as are generally understood in the art.

Certain exemplary row units 12 include known components such as a row cleaner 32 (for clearing debris around a row unit 12) and press wheel 30 (for firming soil after planting). Further in this implementation, a row control module ("RCM") 34 is disposed on the row unit 12 for controlling various components of the row unit 12. Alternatively, any similar known components or features or additional known features or components can be incorporated into the row units 12.

As shown in FIGS. 1-4, planters 10 and their row units 12 may traverse the ground 2 in the direction of reference arrow A. As would be understood, as the row units 12 traverse the ground 2 they may encounter obstructions and various debris, such as rocks 2. It is readily appreciated that while this disclosure references rocks, other debris, obstructions, and obstacles are contemplated and would be readily appreciated by the skilled artisan.

It is readily appreciated that various obstructions 2 may be on the surface and/or subterranean and may be scattered throughout a field. These obstructions 2 may cause damage to a row unit 12 if struck at high speeds. As such, the ability to monitor obstruction strikes allows for the prevention of row unit 12 damage.

As noted above, in various implementations, planter row units 12 include gauge wheels 26, as shown in FIGS. 2-4, and these gauge wheels 26 may include gauge wheel load sensors 36, as has been previously described. In some implementations, the system 100 combines the gauge wheel 26 load sensor 36 data with inertial measurements and/or hydraulic pressure monitoring to sense obstruction 2 strikes while traversing terrain. In various implementations, the sudden loss or increase of gauge wheel 26 load is indicative of obstruction 2 presence, as will be discussed further below.

Figure 5:
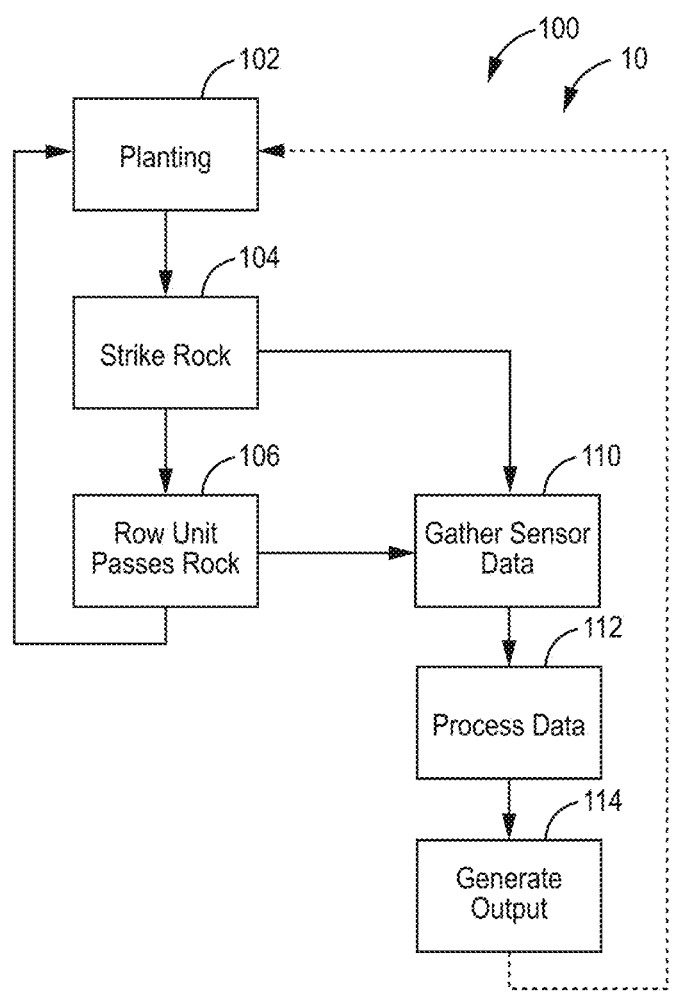
FIG. 5 is a schematic depiction of the system, according to one implementation.

Turning now to FIG. 5, FIG. 5 shows an exemplary implementation of the system 100. In various implementations, the system 100 consists of a series of steps, each of which is optional and may be performed in any order or not at all. Certain steps or series of steps may be performed iteratively.

In certain implementations, the system 100 gathers data on-the-go during planting (box 102) or other agricultural activities. The sensor data collected may include gauge wheel load, vertical acceleration, supplemental downforce system pressure, and location. In various implementations, data collection is continuous. In alternative implementations, various sensor data may be monitored continuously, but only the sensor data just prior to, during, and just after a strike event is recorded, as will be appreciated. In certain implementations a time series of data is recorded around the strike event including the initiation, duration, and cessation of the strike event.

While traversing terrain, such as during planting (box 102), a row unit 12 may strike (box 104) a rock 2 or other obstruction, the initiation of the strike event. As noted previously, these obstruction 2 strikes (box 104) can cause damage to row units 12 especially at high speeds, therefore knowledge of obstruction 2 locations, sizes, and other data may be important to a stakeholder to prevent strike associated damage and ultimately loss of efficiency. As the planter 10 continues to traverse terrain the row unit 12 passes the obstruction 2 (box 106), coming out of contact with the obstruction 2, thereby ending the strike event, and planting operations (box 102) continue.

When a strike (box 104) occurs the system 100 is configured to gather and record various data and sensor information (box 110) regarding the strike (box 104), including the duration and cessation of the event. The system 100 processes (box 112) the data and sensor information (box 110) and generates outputs (box 114), such as maps, alarms, and/or speed adjustments. In certain implementations, the sensor information data (box 110) and/or outputs (114) are stored for use during subsequent operations. For example, a map of obstruction 2 locations and sizes may be used during planting in subsequent seasons to prevent striking large obstructions 2, such as boulders, at high speeds and thereby prevent damage to row units 12. In further implementations, the outputs (114) may include a map of rock 2 and/or other obstruction locations such that a stakeholder can navigate to the obstructions in a field and remove the rocks 2 or other obstructions, thereby preventing future damage and need for other preventative measures.

FIGS. 6-9 depict various sensor data gathered during planting 102. As noted above, the system 100 is constructed and arranged to monitor, gather, and/or record various sensor data during agricultural operations and process such sensor data to determine obstruction strike events and various information corresponding thereto. The exemplary graphs show rock or other obstacle 2 strikes events and the corresponding sensor data during such a strike event. Of course, various alternative obstructions are possible and contemplated herein.

Figure 6:
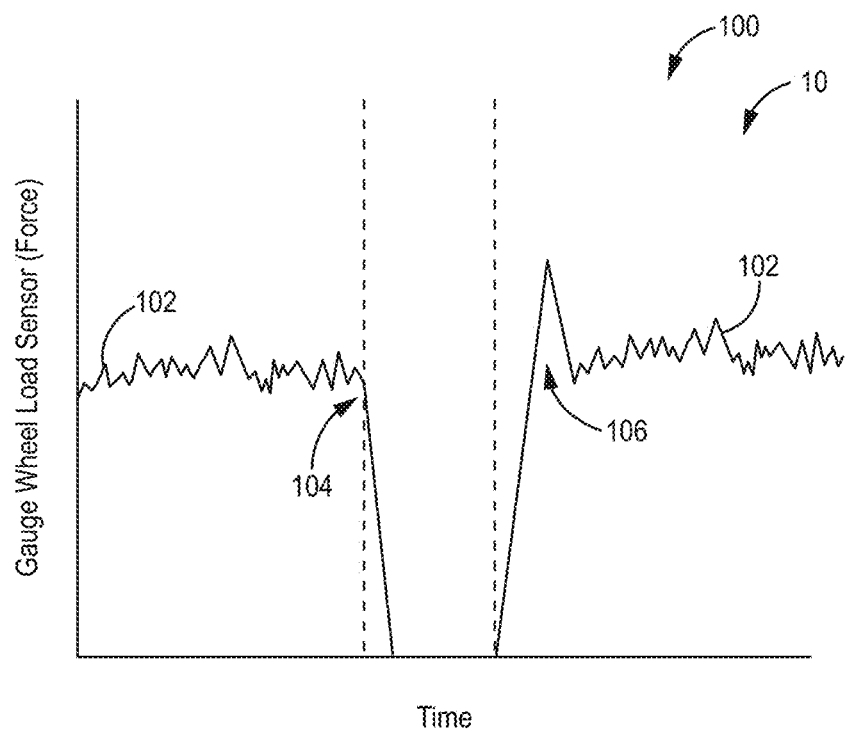
FIG. 6 is a chart depicting gauge wheel load over time, according to one implementation.

Turning to FIG. 6 in more detail, the system 100 may utilize gauge wheel load sensor data to determine when a row unit 12 strikes 104 a rock 2 or other obstruction. As would be understood, during planting, the gauge wheel load typically remains relatively constant, that is, gauge wheel load typically remains within a defined range or threshold. When the row unit 12 encounters an obstruction, such as a rock 2, and strikes 104 the rock 2, or other debris, the gauge wheel load may sharply decrease below a predetermined value of threshold as the opening disks (shown for example in FIG. 3 at 24) or other row unit 12 component contacts or strikes (box 104) the obstruction 2 and the gauge wheel(s) 26 are momentarily no longer supporting the weight of the row unit 12. For example, an opening disk 24 may strike a rock 2 (initiating a strike event) then opening disk 24 may ride on top of the rock (during the duration of the strike event) causing the weight of the row unit 12 to shift from the gauge wheels 26 to the opening disk 24 while the row unit 12/opening disk 24 is in contact with the rock 2. Finally, the row unit 12 will come out of contact with the rock 2 (cessation of the strike event) and return the row unit 12 to a normal operating condition, as will be discussed further below.

While the row unit 12 is in contact with the rock 2 or other obstruction, the gauge wheel load will remain low (below a certain threshold), because the opening disks 24 will continue to support the row unit 12 weight. After the row unit 12 has passed over, come out of contact with, 106 the obstruction 2, the gauge wheel 26 load will sharply increase as the row unit 12 returns to a normal operating position with opening disks 24 penetrating the soil 2 and the gauge wheels 26 supporting the weight of the row unit 12. This second pulse or increase event occurs at the cessation of a strike event, whereby the system 100 may stop recording sensor data.

In various implementations, the system 100 can measure the time between the strike 104 and passing over 106 the obstacle 2, that is the duration of the strike event. This time from strike 104 or first pulse to a second pulse where the row unit 12 has passed over 106 the obstacle 2 may be correlated to the size of the rock 2 or other debris.

In further implementations, the system 100 can measure the rate at which gauge wheel load decreased upon striking 104 the rock 2, at the initiation of the strike event, to determine if a rock 2 was struck or alternatively if the soil hardness increased. An increase in soil hardness may result in a more gradual decrease in gauge wheel load when compared to the sharp decrease upon encountering a solid obstruction. In various implementations, the system 100 includes a threshold rate of decrease in gauge wheel load to trigger the recordation of a strike event. In various implementations, the threshold rate may be user entered, predetermined by the system 100, or acquired via various machine learning techniques as would be appreciated by those of skill in the art.

In still further implementations, the system 100 can measure the difference between the peak force after the row unit 12 passes 106 the rock 2 (the peak force at the cessation of the strike event) and the steady state or normal operating load and correlate the difference as a measure of the height of the rock 2. The downward momentum of the row unit 12 along with a supplemental downforce system can cause a higher target gauge wheel load, the larger the difference between peak load and target load the higher the rock 2 or other obstruction is estimated to be.

Figure 7:
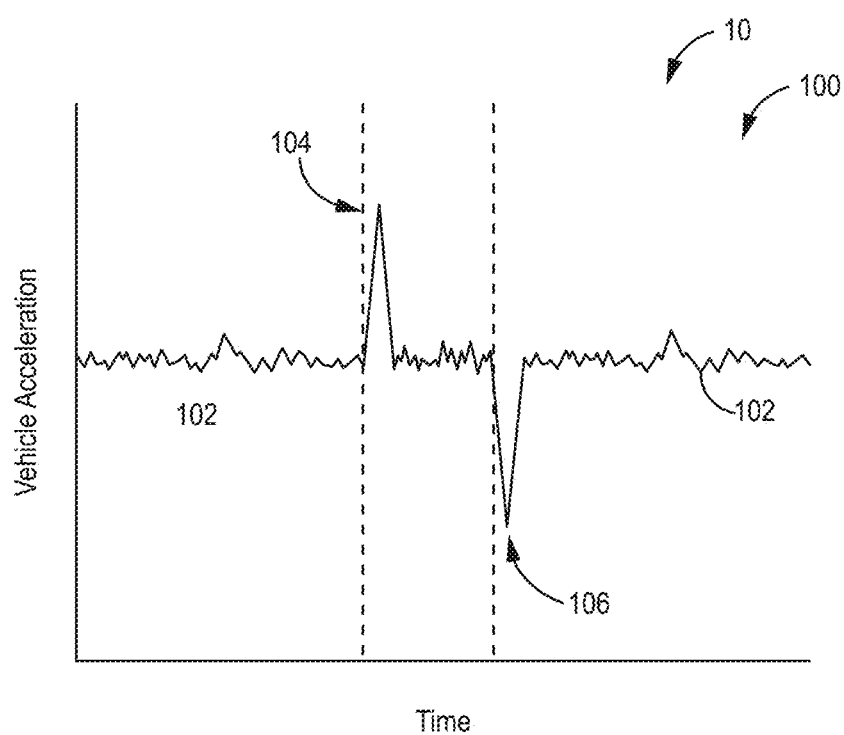
FIG. 7 is a chart depicting row unit vertical acceleration over time, according to one implementation.

In some implementations, the system 100 may utilize the vertical acceleration of a row unit 12 to measure and locate obstacle 2 strike events, strike severity, and/or obstacle 2 size, as shown in FIG. 7. The vertical acceleration of a row unit 12 may be measured via a gyroscope, accelerometer, inclinometer, or other device as would be recognized by those of skill in the art. During planting 102 row unit vertical acceleration typically remains relatively constant, that is the vertical acceleration remains at a baseline and/or within a defined range or threshold. During a strike event, as a row unit 12 strikes 104 an obstruction 2 the upward acceleration of the row unit 12 increases sharply above a threshold value. After the row unit 12 passes 106 the obstruction 2, at the cessation of the strike event, the row unit 12 accelerates downward sharply returning to the baseline or defined range.

In various implementations, the system 100 is configured to measure the time between the upward and downward acceleration spikes, the duration of the strike event, which may be an indication of obstacle or rock 2 size.

Further, the system 100 may measure the magnitude of the upward and downward acceleration as a measurement of the vertical location of the obstacle 2—for example the height of the rock 2 above the soil and/or the depth of the rock 2 within the soil. The further above the ground or closer to the surface (for a subterraneous rock) the greater the magnitude will be.

In still further implementations, the system 100 may measure the magnitude of the increase in acceleration above the baseline, as an indicator of stress applied to the row unit 12. If the stress to the row unit 12 is high (shown by a large magnitude) the ground speed may need to be slowed to minimize damage to the planter 10 and/or the row unit(s) 12.

In various implementations, the system 100 may monitor both gauge wheel load and vertical acceleration to determine the location, severity, size, and other sensor data about obstruction strike events. In certain implementations, the system 100 and associated processor(s) may correlate the gauge wheel load data and vertical acceleration data to more accurately determine when rocks 2 or other debris are struck and the various data about the strike events.

Figure 8:
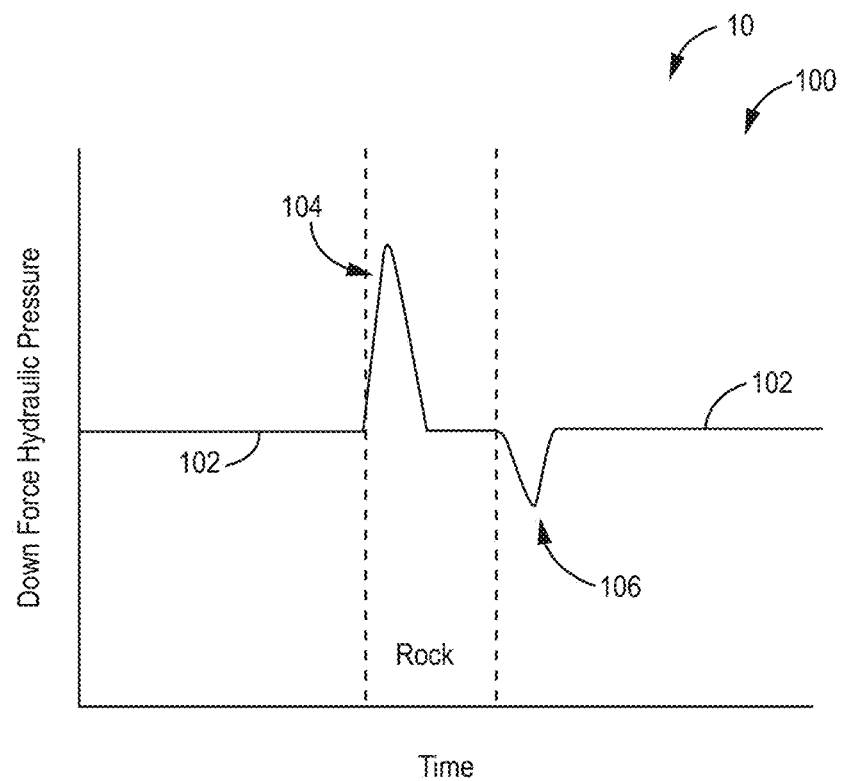
FIG. 8 is a chart depicting down force hydraulic pressure over time, according to one implementation.
Figure 9:
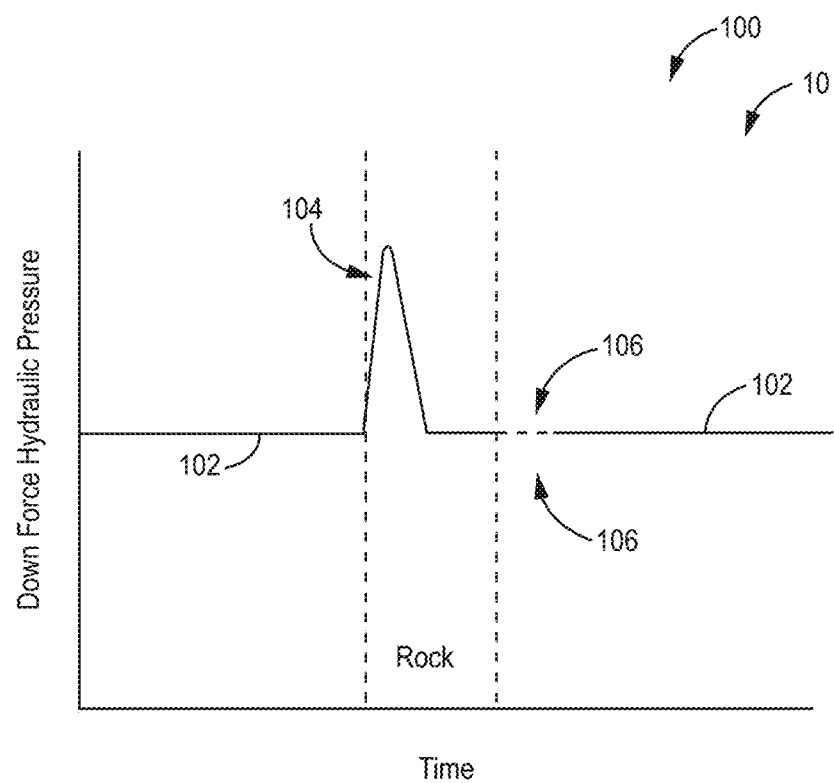
FIG. 9 is a chart depicting down force hydraulic pressure over time, according to one implementation.

FIGS. 8 and 9 show bore pressure of a supplemental downforce system—like those discussed in the incorporated references—during planting 102. In this implementation, the system 100 may utilize fluctuations in bore pressure over time to locate obstructions 2, estimate the size of the obstructions 2, and determine severity of obstruction 2 encounters. As would be understood, the bore pressure may be used independently by the system 100 and/or used in conjunction with the gauge wheel load, vertical acceleration, and/or other sensor data as would be appreciated.

During planting 102, downforce bore pressure typically remains substantially constant at an established baseline or threshold value. During a strike event, when a row unit 12 strikes 104 an obstruction 2, the bore pressure of a downforce system may increase abruptly. After the strike 104 the bore pressure will drop, such as via a reducing valve, back to the baseline. Once the row unit 12 passes 106 the obstruction 2, at the cessation of a strike event, the bore pressure may drop as the row unit 12 falls back to ground level. In some situations, where the obstruction 2 is subterraneous, there may be no drop in bore pressure when the row unit 12 passes 106 the obstruction 2, as shown in FIG. 9. It is further appreciated that alternate implementations can make use of rod pressure changes in the same fashion.

In various implementations, the system 100 is configured to measure the time between the beginning of the bore pressure increase and the beginning of the bore pressure decrease/drop, which may be an indication of obstruction 2 size. That is, in various implementations the system 100 is configured to detect the change in bore pressure and the timescale of the change, that is, how long the pressure change persisted—the duration of a strike event. Such recordings can be compared with the speed of the planter 10 to establish the size of the obstruction. It is appreciated that in certain implementations, the system 100 will begin recording an obstruction based on a percent change or other threshold value in bore pressure, that is, if the bore pressure deviates from normal by a certain defined threshold, the system 100 is configured to record a time value for the period or time the planter is in contact with the obstacle 2. It is further understood that in such implementations, the time value will be stopped when the bore pressure returns to a value within a defined normal range, as would be readily appreciated.

Further, in some implementations, the system 100 is configured to measure the differential pressure between the peak (at the beginning of a strike event 104) and baseline as an indicator of depth and/or height of an obstacle 2.

In some implementations, a user may traverse the ground with an implement equipped with the system 100 to collect data regarding the location of obstructions or rocks 2 within the field with or without performing another agricultural operation, such as planting. In some implementations, the system 100 may also collect data regarding obstruction 2 strike event severity and obstruction 2 size, as discussed above.

Figure 10:
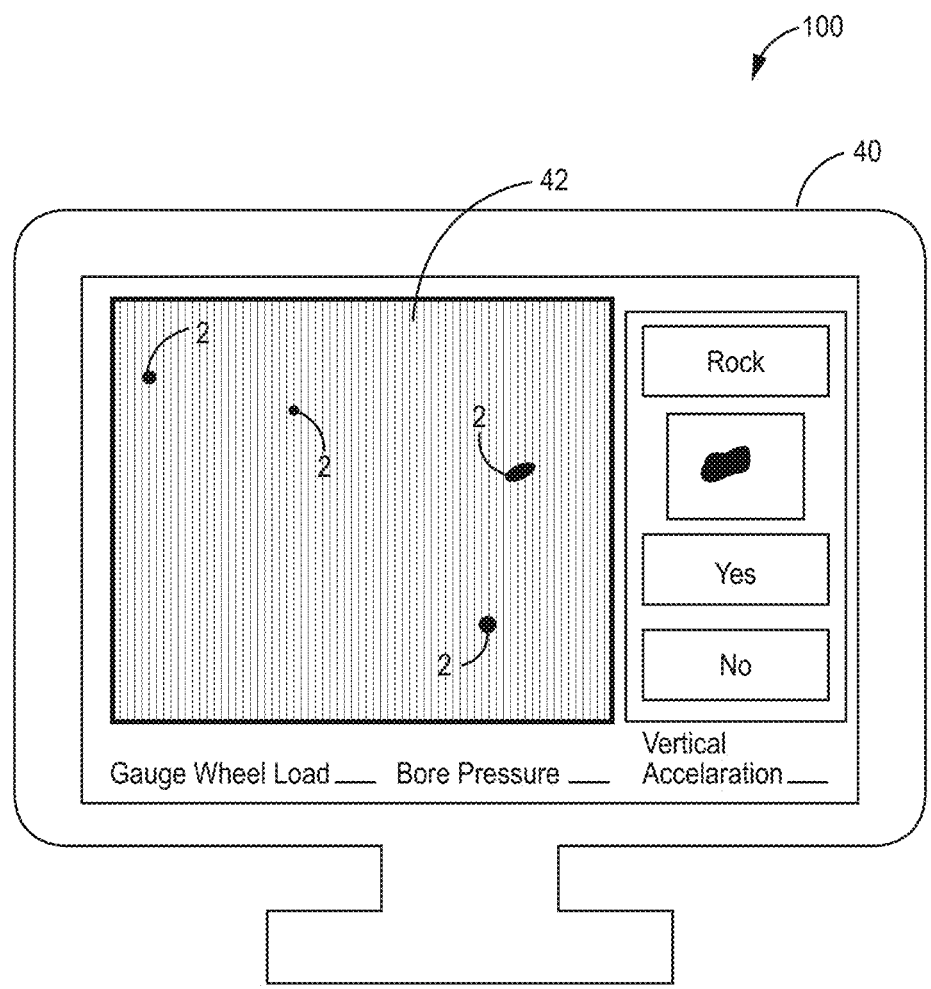
FIG. 10 shows an exemplary display, according to one implementation.

In various implementations, the obstruction 2 strike location data, which may include strike severity data and size data, can be plotted on a map 42, shown for example on a display 40, such as is shown in FIG. 10 and readily understood in the art. As location data is recorded the user may be able to increase or decrease ground speed or allow the planter or other implement to increase or decrease ground speed automatically, as appropriate. In some implementations, the obstruction map 42 may be evaluated by a user or automatically by the system 100 to determine the fields or portions of fields that may be planted with high-speed planting while eliminating or minimizing row unit 12 damage.

In further implementations, the system 100 may use an obstruction map 42 to generate a speed prescription map to automatically control ground speed and/or alert a user to adjust ground speed. In some implementations, the system 100 may be configured to alert a user, such as via an alarm on a display 40, to decrease ground speed or increase ground speed.

Additionally, the system 100 may be configured to automatically and proactively reduce supplemental downforce if an obstacle 2 encounter is anticipated. The decrease in downforce applied to the row unit 12 may reduce the severity of a rock 2 strike or other obstacle encounters. It is appreciated that the adjustment to supplemental downforce could also be manual upon prompting of a user by the system 100.

In various implementations, the system 100 may be able to determine the severity of an obstacle 2 strike. As would be appreciated, as ground speed increases so too does strike severity. In various implementations, the system 100 may display to a user the severity of each strike event in real or near real time, for example via an alert or field on a display 40. The real time or near real time knowledge of strike severity may allow a user to determine if a reduction in ground speed is appropriate and/or necessary to minimize damage to row units 12 while accounting for planting efficiency. Conversely, if strike severity is low a user may determine an increase in ground speed is appropriate. In various implementations, the determination to either reduce or increase ground speed may be automatic.

In further implementations, the data regarding strikes and their severity may be stored via any known storage medium for future access and analysis. In various implementations, certain hardware media storage components can be utilized, as would be readily appreciated.

In certain implementations, the strike data and any map 42 thereof may be utilized by users to pick up rocks 2 or other obstructions from fields or other areas. As discussed above the system 100, is configured to automatically flag the presence of both surface and subterraneous obstructions 2 on a row-by-row basis. As such, the strike map 42 may be used to locate an obstruction 2 within a field such that the obstruction 2 can be removed from the field.

In further implementations, the system 100 may be in communication with other agricultural mapping systems, such as AgFiniti®, where users may be mobile and able to access the obstruction maps 42—such as via a display 40—on-the-go, between different vehicles, and/or remotely. For example, in certain implementations, the system 100 may generate a path for the collection of all or select rocks 2 from a field and automatically or manually guide a user or other utility task vehicle ("UTV") to the location of the rocks 2 to be removed. In some implementations, the system 100 is configured to generate a guidance path to steer a tractor, UTV, or other vehicle to the location of each rock 2 or other obstruction for removal.

Although the disclosure has been described with references to various embodiments, persons skilled in the art will recognized that changes may be made in form and detail without departing from the spirit and scope of this disclosure.

What is claimed is:

1. An agricultural planter monitoring system, comprising:
    (a) a plurality of row units, each row unit comprising:
        (i) at least one gauge wheel;
        (ii) a gauge wheel load sensor in communication with the at least one gauge wheel, and
        (iii) an inertial measurement unit constructed and arranged to monitor vertical acceleration of a row unit, and
    (b) a processor in communication with the gauge wheel load sensor,
    wherein the processor is configured to monitor data from the gauge wheel load sensor and changes in vertical acceleration from the inertial measurement unit to determine when a row unit strikes debris.

2. The system of claim 1, wherein debris is a rock.

3. The system of claim 1, further comprising a storage media in communication with the processor, the storage media constructed and arranged to store data about debris strikes.

4. The system of claim 3, wherein the storage media stores at least one of debris strike location, debris strike severity, acceleration of the row unit at time of debris strike, and gauge wheel load.

5. The system of claim 1, further comprising a display in communication with the processor, the display configured to show a user at least one of a map of debris strikes and an alarm for impending debris strikes.

6. The system of claim 1, further comprising an automatic steering system constructed and arranged to slow planter speed when a debris strike is imminent.

7. The system of claim 1, further comprising a supplemental downforce system wherein a bore pressure of the supplemental downforce system is monitored by the processor and changes in the bore pressure are correlated to changes in terrain including debris presence.

8. The system of claim 1, wherein the processor is further constructed and arranged to determine debris size, location, and vertical position.

9. A method for sensing debris in an agricultural field comprising:
monitoring gauge wheel load sensor data on-the-go;
monitoring vertical acceleration from an inertial measurement unit; and
determining debris strikes from the gauge wheel load sensor data and inertial measurement unit data.

10. The method of claim 9, wherein a debris strike is found when gauge wheel load decreases at a rate above a predetermined threshold.

11. The method of claim 9, further comprising determining size of debris, wherein the size of debris is correlated to a time between debris strike and disengagement with debris.

12. The method of claim 9, further comprising determining debris height, wherein debris height is correlated to a difference between peak gauge wheel load after disengaging debris and normal operating gauge wheel load.

13. The method of claim 9, further comprising monitoring bore pressure of a supplemental downforce system.

14. The method of claim 9, further comprising generating a speed prescription map.

15. The method of claim 9, further comprising generating a debris location map.

16. The method of claim 9, further comprising alerting a user of an impending debris strike.

* * * * *